United States Patent [19]
Wenstrand

[11] Patent Number: 5,829,386
[45] Date of Patent: Nov. 3, 1998

[54] POULTRY FOUNT

[76] Inventor: Thomas W. Wenstrand, 1702 Oakland Mills Rd., Mt. Pleasant, Iowa 52641

[21] Appl. No.: 867,181

[22] Filed: Jun. 2, 1997

Related U.S. Application Data

[63] Continuation-in-part of Ser. No. 607,163, Feb. 26, 1996, abandoned.

[51] Int. Cl.⁶ .................................................. A01K 39/026
[52] U.S. Cl. .............................................................. 119/77
[58] Field of Search ................................ 119/51.5, 74, 77

[56] References Cited

U.S. PATENT DOCUMENTS

| | | | |
|---|---|---|---|
| 331,097 | 11/1885 | Strong | 119/77 |
| 854,615 | 5/1907 | Vorheis et al. | 119/77 |
| 903,041 | 11/1908 | Yerian et al. | 119/77 |
| 1,571,409 | 2/1926 | Hayes | 119/77 |
| 1,801,932 | 4/1931 | Miller | 119/77 |
| 1,838,324 | 12/1931 | Olson | 119/77 |
| 5,682,835 | 11/1997 | Walter et al. | 119/77 X |

*Primary Examiner*—Robert P. Swiatek

[57] ABSTRACT

A poultry waterer of the vacuum discharge type adapted for use in sizes larger than the type which is tipped for placement for use. The waterer is characterized by being permanently upright, having an easily used filler cap and a detachable tray or trough fed by a spout at the bottom of the tank. A cup and O-ring permit the closing of the hole in the spout, preventing premature discharge of liquid while the waterer is being filled. Also, the filler cap includes a unique cup and gasket arrangement which allows easy opening of the cap.

5 Claims, 2 Drawing Sheets

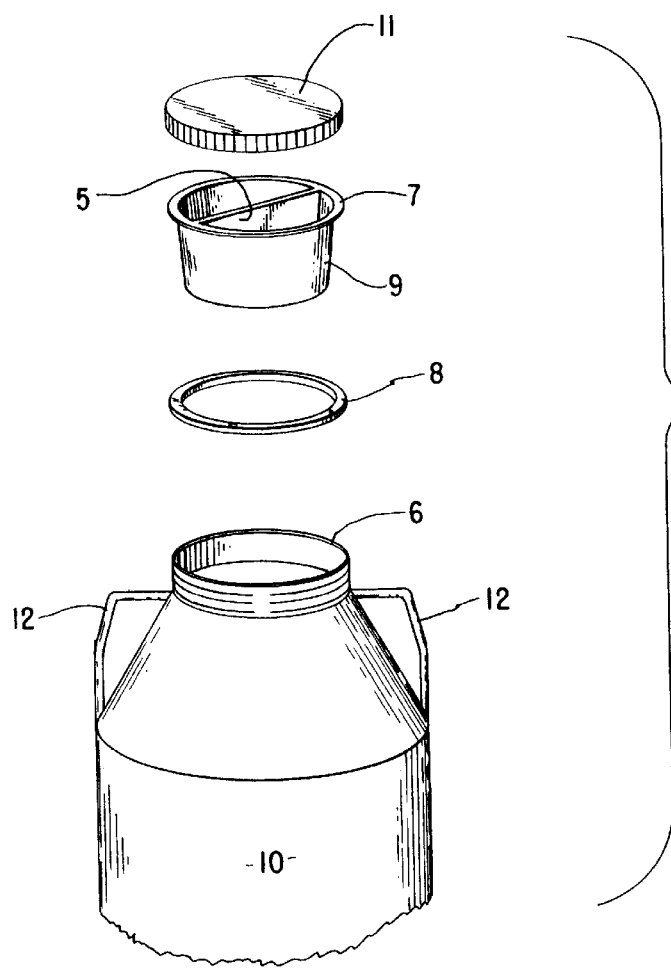
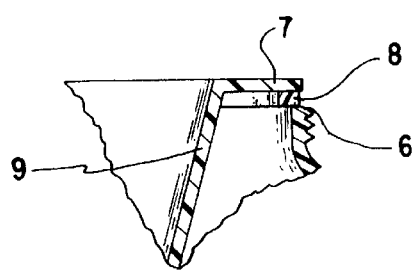

_5,829,386_

POULTRY FOUNT

This application is a continuation-in-part of a previous application by the same inventor, Ser. No. 08/607,163, filed Feb. 26, 1996 and now specifically abandoned. This invention pertains to devices for providing liquid, particularly water, to poultry. More particularly the device is a waterer of the general type illustrated in my prior U.S. Pat. No. 5,218,926 but adapted to sizes larger than can readily be used for that particular class of waterer.

BACKGROUND AND SUMMARY OF THE INVENTION

Vacuum discharge waterers of the type shown in my prior patent are not new. That previously disclosed design has been well used in smaller units where the filling of the tank is at an open end and then the trough unit is put in place and the assembly is tipped upright for use as a waterer. However, in instances where a unit is of approximately five gallons or larger, the weight of contents of the filled tank alone is forty or more pounds and handling a unit of that weight becomes a problem, especially if inverting of the tank is necessary.

It has also been discovered that the opening of the filler cap, especially on larger units, becomes difficult because of the vacuum drawn inside the tank. A unique arrangement of a gasket and a cup inside the filling opening can be used to relieve that vacuum to provide much easier removal of the filler cap.

By the present invention, applicant provides a unit permanently upright and filled from the top. A unique trough and discharge spout makes the device very useful and practical as a waterer of the vacuum discharge type having a somewhat larger capacity than can be readily handled where inverting of the tank is required.

BRIEF DESCRIPTION OF DRAWINGS

FIG. 6 is a detailed perspective view of the top of the tank showing the unique filling closing device, and FIG. 7 is a detailed sectional view of the arrangement of the O-ring at the filling closure device.

DESCRIPTION

Figure 5:
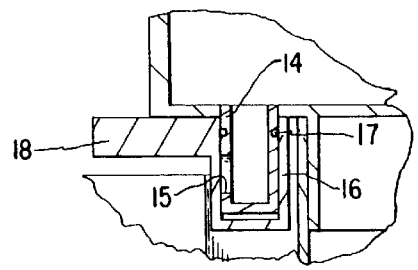
FIG. 5 is a partial sectional view to an enlarged scale of the discharge spout on the tank, and the cup and O-ring permitting closure of the hole in the discharge spout.
Figure 2:
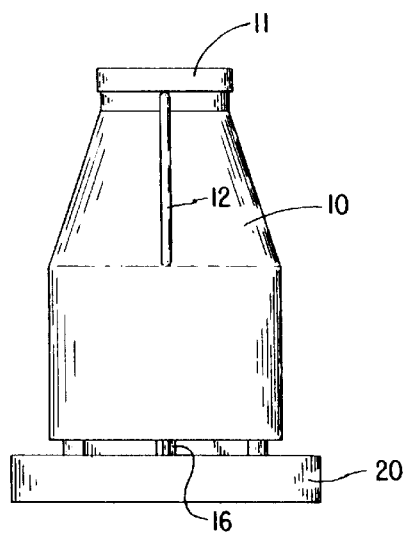
FIG. 2 is a side elevational view of the waterer.

Briefly this invention comprises a vacuum discharge type poultry waterer capable of being filled from the top so that inversion is not necessary. The problems of premature discharge while filling is completely avoided, as is the problem of vacuum, within the tank making opening difficult.

More specifically and referring to the drawings, the device includes a tank 10 having a top opening enclosed by a cap 11. The cap must be tight-fitting because of the need for a vacuum above the water level. Therefore, as shown, a screw threaded engagement of the cap with the tank is preferred. Handles 12 may also be provided if carrying becomes desirable.

Because emptying of the tank in normal use causes a vacuum inside the tank, there are occasions when it becomes difficult to remove the cap 11 against that vacuum. By using the closure means shown in FIG. 6 that difficulty may be avoided. As shown in those figures, an entry cup 9 is fitted into the opening. A gasket or O-ring 8 is engaged between a flange 7 on the top of the cup 9. The rim 6 of the top opening of the container 10 presses against the gasket to seal the filler opening as the cup 11 is screwed into place. However, because the O-ring is formed of relatively soft material, and because the cup 9 may be somewhat flexible, the vacuum can be somewhat relieved so that the top can be readily opened even by hands partly disabled by arthritis.

Thus there are alternate closure means. Either a plain screw-threaded cap 11 can be used or, particularly on the larger units, a vacuum breaker device such as the cup and gasket device can be used.

It should be noted that the cup can also be used as a measuring device. Simple divisions on the side of the cup, as is well known in the art, can provide for measured dosages of medicine material, or the cup can be divided into specific sizes of compartments by a divider 5, to allow measurements of additive material. These additives might well be medication, but they could also be used for nutritional additives.

At the bottom of the tank a discharge means including a discharge spout 14 is provided. This spout receives liquid from the tank 10 and discharges it through a hole 15. A cup 16 is adapted to close the discharge. This cup is adapted to fit snugly over the spout 14 and is both made nearly water tight and is retained by an O-ring 17 fitted between the cup 16 and the spout 14. A handle 18 on the cup allows easier manipulation of the cup 16 as will appear.

Figure 1:
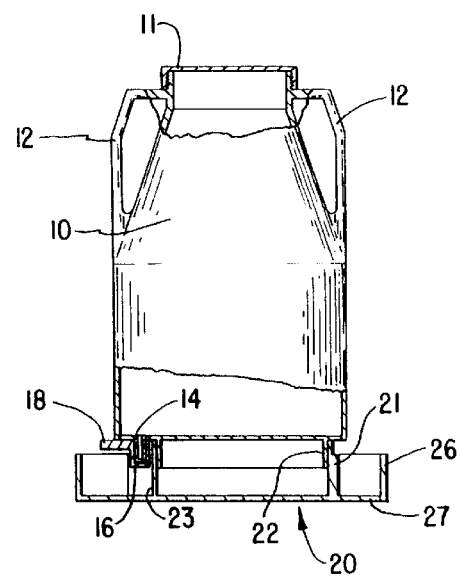
FIG. 1 is a front elevational view, partly in section, of the assembled waterer.
Figure 3:
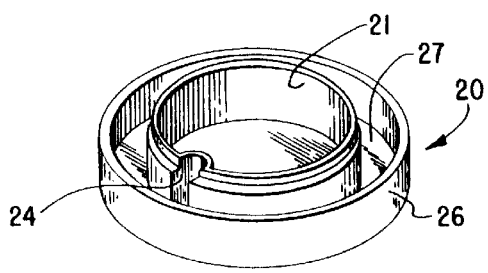
FIG. 3 is a top perspective view of the trough piece separate from the tank portion.
Figure 4:
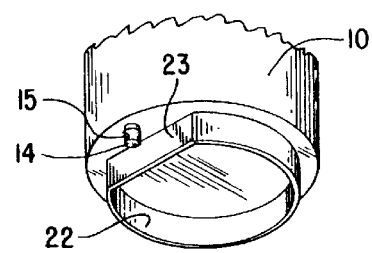
FIG. 4 is a partial bottom perspective view of the tank portion with the trough removed.

The trough means 20 includes an inner ring 21 adapted to form a snug fit with a bottom collar 22 on the tank. The collar 22 is formed to avoid interference with the discharge spout 14 by using a flat space 23 across the otherwise circular form. The inner ring 21 of the trough means includes an indentation 24 large enough to accommodate the discharge spout 14 and its closure cup 16. Thus, as shown in FIG. 1, the assembly forms a snug fitting device.

The trough itself is formed by the inner wall 21 and an outer wall 26 combined with the floor 27. Although the preferred embodiment is as shown, the floor may extend fully across the bottom of the trough member 20 and not just across the space between the inner and outer walls. This would provide a simple means for fastening the waterer in place if desired. Simply by bolting or using screws through the center part of the floor, the position of the waterer may be fixed and fastened so that it will not be tipped accidentally.

In use, the cup 16 must be securely in place on the spout 14 as the tank is filled after the cap 11 is removed. If the cup 16 is not in place, liquid will gush from the opening 15 because there is no cap closing the tank and therefore no vacuum above the level of the liquid. After filling, the cap 11 is replaced tightly so that if liquid is discharged through the spout, a vacuum will be formed above that liquid and tend to hold the liquid within the tank subject only to bubbles of air entering the tank through the hole 15. So long as the cup 16 covers that hole, there will be no discharge. Thus, even if the tank 10 should be removed and carried away for filling, it can be carried back to the trough member 20 for reassembly without a stream of liquid being discharged.

When the tank 10 is again fitted onto the trough 20, the cup 16 may be safely removed from the spout 14 and the liquid allowed to fill the trough. When the level in the trough is high enough to cover the hole 15, discharge will stop until the level drops to allow air bubbles into the tank. Then more liquid will flow until the hole 15 is again covered.

If the tank is filled in place, the cup 16 is simply used to cover the hole 15 until the cap 11 is replaced. At that time, the cup can be removed from the spout 14 as previously described and the waterer is ready for use.

I claim as my invention:

1. A waterer comprising a tank having a filler opening at a top end of said tank, closure means adapted to seal said filler opening, discharge means including a spout extending from the bottom of said tank, closure means adapted to close said discharge means, and trough means being adapted to receive and hold liquid from said tank, said discharge means being long enough to extend into said trough means below said upper edges and able to extend below the surface of said liquid in said trough means, said tank including a ring-shaped collar formed on the bottom thereof, said collar having one flat space, said spout on the bottom of said tank being outside of said flat space on said collar whereby said spout discharges into said trough means, said trough means including an inner wall slidingly fitted onto said collar whereby said tank and said trough means are releaseably attached together.

2. The waterer of claim 1 in which said inner wall of said trough means is formed to extend between said spout and said flat space on said collar whereby said spout discharges into said trough means.

3. The waterer of claim 2 in which a cup-like container is removably fitted over said spout whereby said spout is closed to withhold discharge.

4. The waterer of claim 1 in which said closure means includes a rim on said filler opening, a cup having a flange, said flange being fitted to said rim, a gasket around said cup and disposed between said flange and said rim.

5. A waterer comprising a tank having a filler opening at a top end of said tank, said opening including a rim around said opening, a cap adapted to close said filler opening, a cup having a flange fitted to said rim and a gasket engaged between said flange and said rim, said cap being fitted to said opening and holding said cup and said gasket in place in said filler opening, and cup being thereby removable from said opening, discharge means extending from the bottom of said tank, and trough means releasably attached to said tank adapted to receive liquid from said discharge means, said trough means having walls with upper edges, said trough means being adapted to receive and hold liquid from said tank, and said discharge means being long enough to extend into said trough means below said upper edges and able to extend below the surface of said liquid in said trough means.

* * * * *